UNITED STATES PATENT OFFICE.

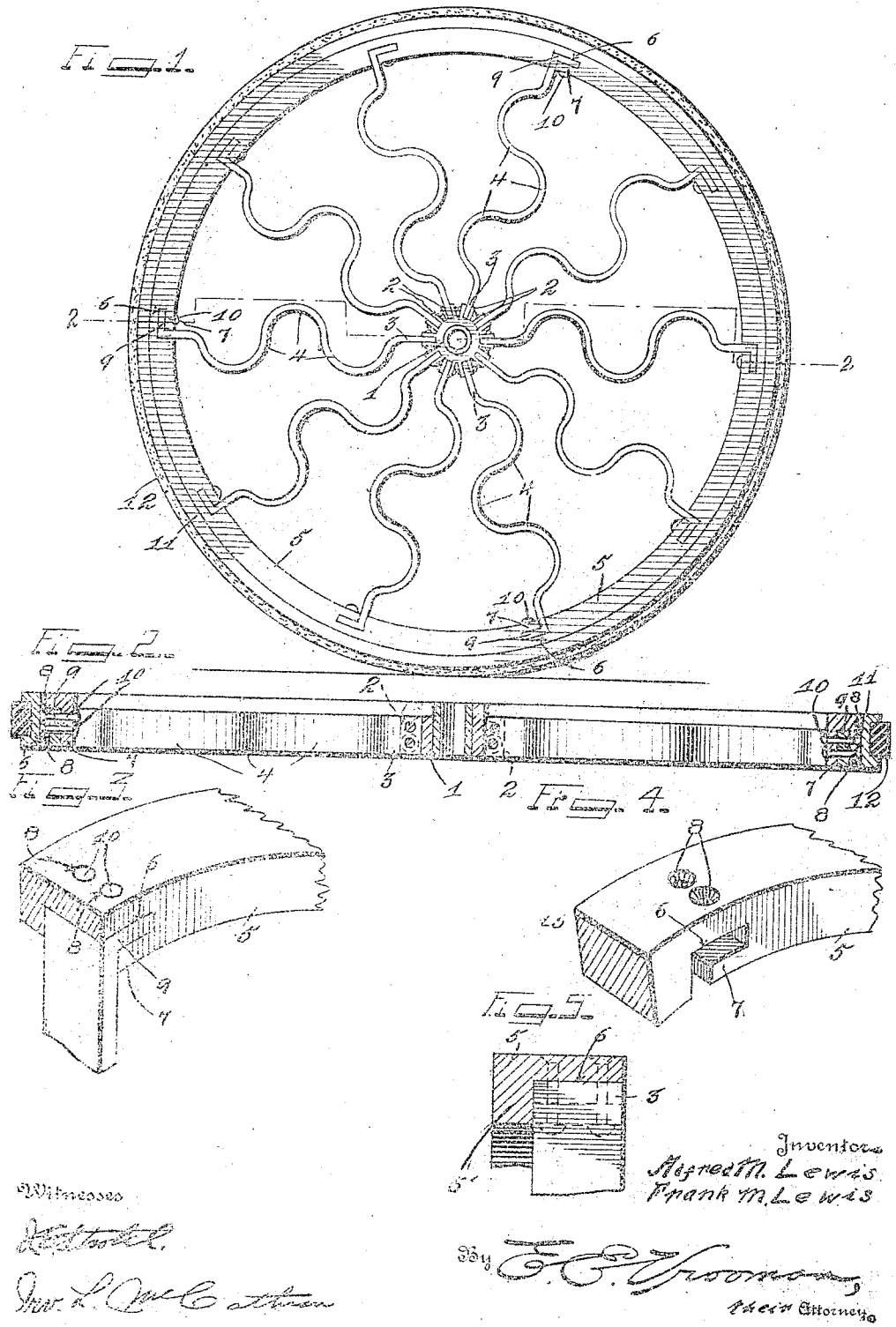

ALFRED M. LEWIS AND FRANK M. LEWIS, OF MINTER, TEXAS.

AUTOMOBILE-WHEEL.

1,117,135.

Specification of Letters Patent. Patented Nov. 10, 1914.

Application filed November 8, 1913. Serial No. 799,934.

*To all whom it may concern:*

Be it known that we, ALFRED M. LEWIS and FRANK M. LEWIS, citizens of the United States, residing at Minter, in the county of Lamar and State of Texas, have invented certain new and useful Improvements in Automobile-Wheels, of which the following is a specification, reference being had therein to the accompanying drawing.

This invention relates to spring wheels and has for its object the production of a simple and efficient means for producing a spoke which will eliminate the necessity of employing an inflated tire.

Another object of the invention is the production of a simple and efficient means for attaching the spoke both to the hub and to the felly of the wheel.

Other objects and advantages of the present invention will appear throughout the following specification and claim.

In the accompanying drawing: Figure 1 is a side elevation of the wheel. Fig. 2 is a section taken on line 2—2 of Fig. 1. Fig. 3 is a perspective view of a portion of the felly partly shown in section showing the spoke attached thereto. Fig. 4 is a detail perspective of a portion of the felly showing the spoke removed therefrom. Fig. 5 is a transverse section through the felly showing the spoke positioned within the spoke receiving socket.

By referring to the drawings it will be seen that 1 designates the hub which is provided with a plurality of divergingly extending flanges 2, which are arranged in spaced relation to assume a substantially tooth-like structure. The spokes 3 have their inner ends placed between a pair of the flanges 2 and are held in engagement therewith by means of rivets such as illustrated in Fig. 1. The spoke 3 is provided with a plurality of alternately oppositely extending bulge portions 4 to add resiliency to the spoke 3 and permit the free compression of the spokes under unusual jar.

The felly 5 of the wheel is provided with a plurality of substantially L-shape notches 6, which extend for only a portion of the width of the felly and owing to the shape of these pockets will produce a tongue 7 adjacent each pocket. In view of the fact that the pockets 6 only extend for a portion of the width of the felly 5 it will be seen that a stop bridge or wall 6' will be produced for the purpose of limiting the transverse movement of the spoke in one direction upon the felly 5. The outer end of each spoke is provided with a laterally extending foot 9, which foot is adapted to fit in the L-shape notch or socket 6 for constituting an efficient means for attaching the spoke 3 to the felly. The felly is provided with a plurality of apertures 8 through which the rivets or other suitable or desired means pass for engaging the angularly extending foot 9 of the spokes 3. These rivets or securing means will efficiently hold the spokes in engagement with the felly 5. A rim 11 may be mounted upon the felly and within this rim 11 may be mounted a rubber tire 12 such as illustrated clearly in Figs. 1 and 2.

Having thus described the invention what is claimed as new, is:—

A spring wheel comprising a hub, spring spokes carried thereby, a felly provided with a plurality of sockets, each socket provided with an overhanging lip, each socket also provided with an abutment flange for closing one end thereof, each spoke provided with a laterally extending flange fitting in said pocket and under said lip, one edge of each spoke lying flush with one edge of said felly for producing a smooth face around one edge of said felly; and rivets passing through said lips and laterally extending ends of said spokes and also passing entirely through said felly for constituting an efficient means for clamping said laterally extending foot of each spoke in engagement with said felly.

In testimony whereof we hereunto affix our signatures in presence of two witnesses.

ALFRED M. LEWIS.
FRANK M. LEWIS.

Witnesses:
J. H. RATLIFF,
W. C. HOLT.